United States Patent [19]
Berry et al.

[11] 3,977,007
[45] Aug. 24, 1976

[54] GRAY TONE GENERATION

[75] Inventors: James M. Berry, Deerfield; Anthony J. Hauser, Bellwood; Kurt E. Knuth, Mount Prospect; Gary B. Ollendick, Chicago, all of Ill.

[73] Assignee: Teletype Corporation, Skokie, Ill.

[22] Filed: June 2, 1975

[21] Appl. No.: 583,306

[52] U.S. Cl. .............................. 346/1; 178/6.6 R; 346/75
[51] Int. Cl.² ....................................... G01D 15/18
[58] Field of Search .................... 346/75, 140, 1; 178/6.6 R, 6.6 B, 6.7 R

[56] References Cited
UNITED STATES PATENTS

| | | | |
|---|---|---|---|
| 3,373,437 | 3/1968 | Sweet et al. ........................ | 346/75 |
| 3,604,846 | 9/1971 | Behane et al. ..................... | 178/6.6 R |
| 3,681,650 | 8/1972 | Koll ................................. | 178/6.7 X |
| 3,928,718 | 12/1975 | Sagae et al. ...................... | 178/6.6 R |

*Primary Examiner*—Joseph W. Hartary
*Attorney, Agent, or Firm*—W. G. Dosse; J. L. Landis

[57] ABSTRACT

An ink jet printer in which refined half-tones or shades of gray are produced while retaining high contrast capability using a dot matrix in which the dots are of the same density for the same shading plus or minus one drop of ink at selected dot locations within the matrix but with each dot being printed in response to an individual shading density or darkness input signal.

11 Claims, 4 Drawing Figures

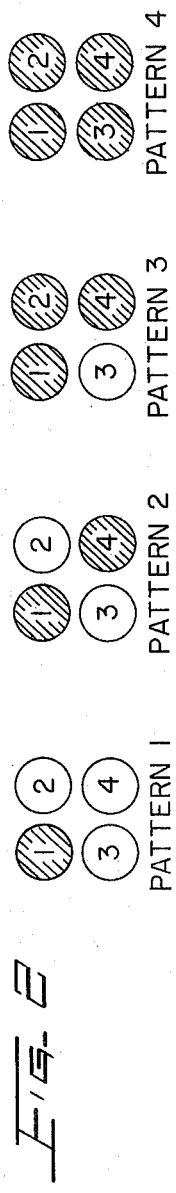
FIG. 2
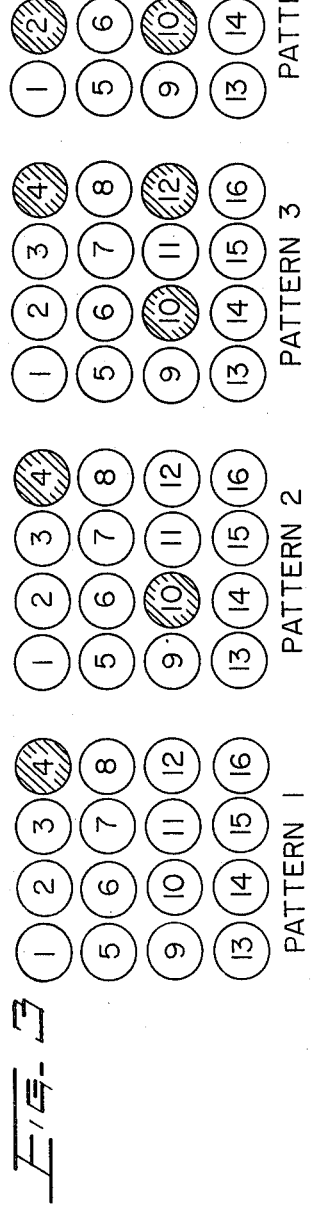
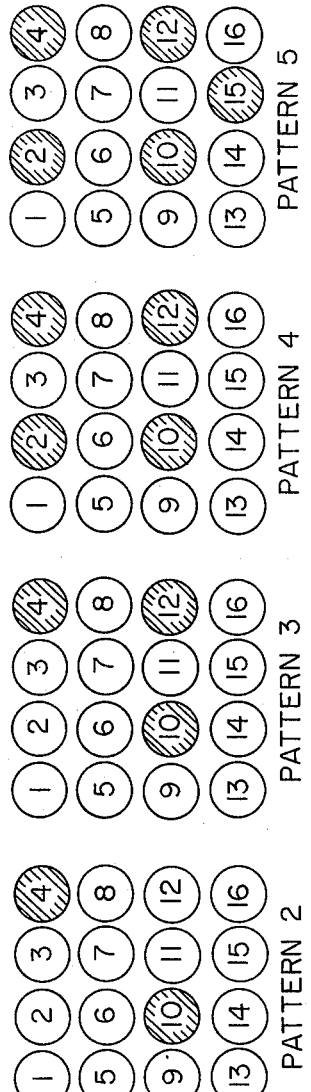
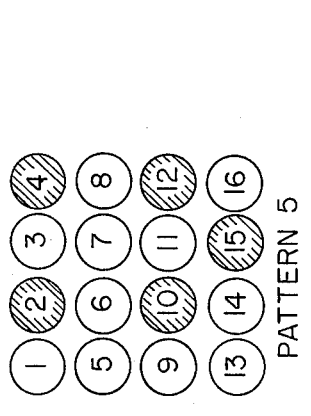
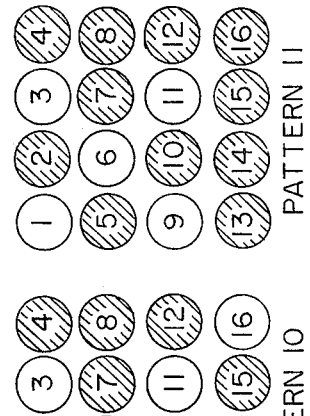
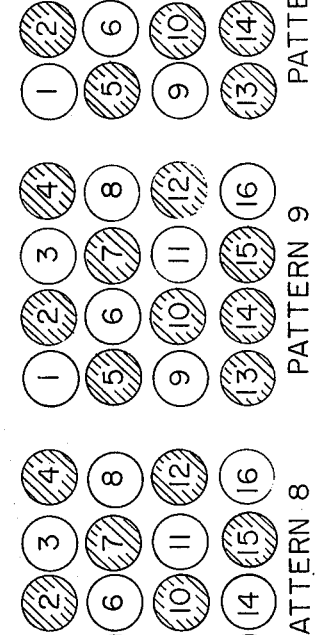
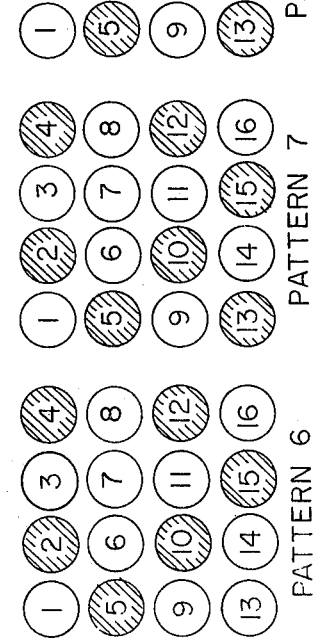
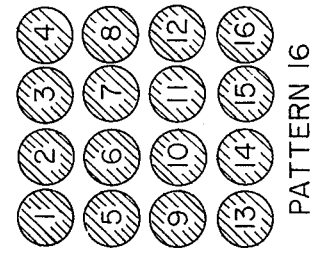
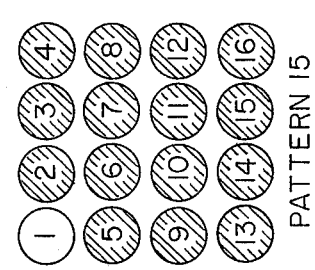
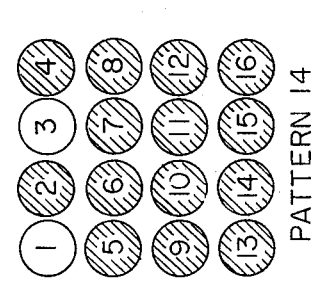
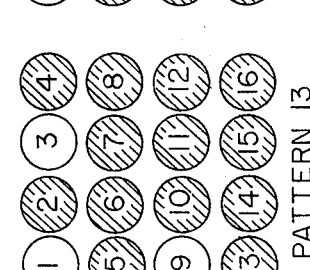
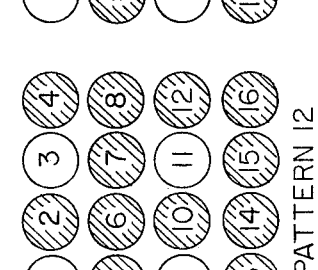
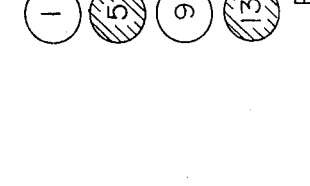
FIG. 3

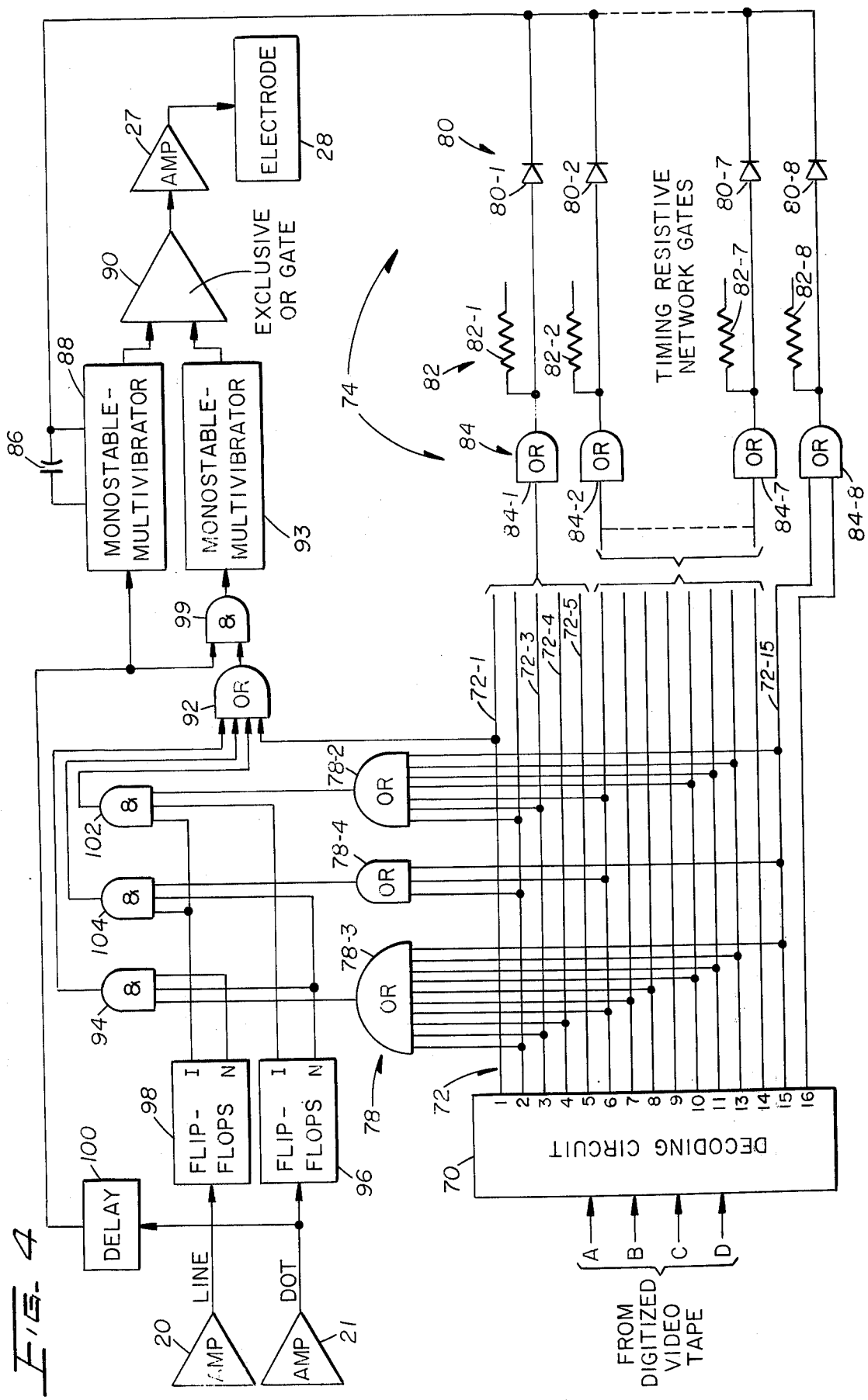

GRAY TONE GENERATION

FIELD OF THE INVENTION

The present invention relates to image reproduction and more particularly to the reproduction of gray shades or half-tones.

BACKGROUND OF THE INVENTION

It has long been known that shades of gray can be produced in ink jet recording by various techniques. U.S. Pat. No. 3,604,846 granted to D. Behane et al. on Sept. 14, 1970, teaches the technique in which a matrix of, for example, nine dots is formed with each dot being of the maximum density of the ink jet mechanism. In the Behane et al. patent a lighter gray shade is formed by recording or printing fewer dots within a matrix area. A darker gray shade is produced by recording more dots within the matrix area. All dots have the same size or density. U.S. Pat. No. 3,373,437, granted on Mar. 12, 1968, to R. G. Sweet teaches the formation of gray shades by depositing different numbers of drops at the various dot locations on the copy to vary the dot size and thus darkness or tonal density. Both of these systems experience some limitation.

In the system of the Sweet patent using a variable number of drops, a prohibitively large number of drops is required to form each dot in order to achieve the maximum degree of darkness while permitting sufficient gradations in between.

Likewise, the system of the Behane patent has distinct drawbacks because a matrix of equal-density dots selectively applied is also generally very coarse. If the matrix cell size or area is made large enough to contain a sufficient number of dots for an acceptably large range of gray tones, the reproduction lacks fineness of detail and is rather crude in appearance.

Furthermore, a visually linear progression of shades of gray (approximately equal density or a Munsell distribution) results from neither a linear progression of numbers of dots in a matrix cell or area nor from a linear progression of numbers of drops of ink to make up a dot.

Actually, the change from no drops of ink to one drop of ink or from no dots in a matrix cell to one dot is a much more pronounced change in the visual perception of the shade then the change from one less than the maximum number of dots or drops to the maximum number of dots or drops. That is, each unit of ink has a far greater visual effect at the light end of the tone scale than at the dark end. Therefore, in each of the systems, fewer visually equal tones are possible than the number of dots in a matrix cell or drops in a dot would at first suggest.

It is an object of the present invention to produce an acceptably large range of gray tones from a dot printing device such as in ink jet recorder with a minimum variation in the size or density of each printing dot or mark.

Another object of this invention is to maximize the resolving capability of the recorder, especially at the dark end of the tone scale.

SUMMARY OF THE INVENTION

In accordance with the present invention, shades of gray are reproduced in an ink jet recorder by depositing at a predetermined dot location in a matrix cell on a record a number of drops of ink substantially representative of the shade to be recorded at the matrix cell location and based upon the location of the predetermined dot within the matrix cell, selectively adjusting by one the number of drops of ink deposited at the predetermined dot location so as to refine the density of the image recorded on the record.

BRIEF DESCRIPTION OF THE DRAWINGS

A more complete understanding of the present invention may be had by referring to the following detailed description when considered in conjunction with the accompanying drawings wherein:

FIG. 2 is a set of exemplary matrix patterns of the simplest type involving only four dot locations per matrix;

FIG. 3 is an exemplary set of 4 × 4 matrix patterns comprising sixteen dot locations within each matrix cell or area; and FIG. 4 is an exemplary schematic diagram of an implementation of the present invention in accordance with the 2 × 2 matrix patterns of FIG. 2.

DETAILED DESCRIPTION

Figure 1:
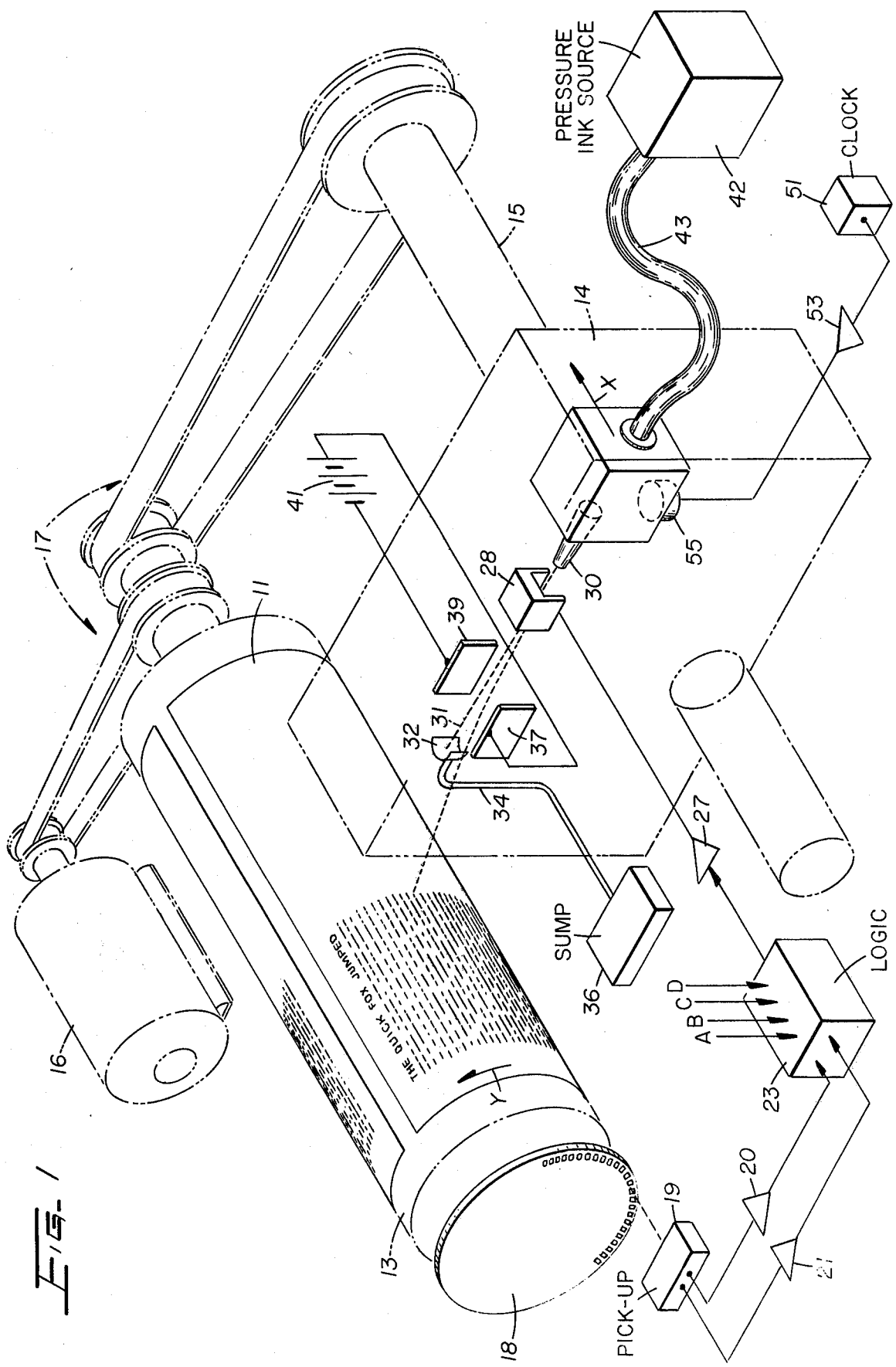
FIG. 1 is a simplified schematic diagram of an ink jet recorder with which the present invention may preferably be used.

Referring now to the accompanying drawings and more particularly to FIG. 1, the basic ink jet recorder has as its main purpose to apply marks to a record medium or paper 11 which is rotated on a platen or drum 13 in a direction indicated by the arrow labeled Y. A recording head enclosed in dotted lines and designated by the reference number 14 traverses along the length of the platen or drum 13 so as to scan in a very fine helical path across the paper 11 for purposes of selectively recording dots thereon. The recording head 14 is moved from left to right in the direction of an arrow labeled X on a helical shaft 15. The drum 13 and the helical shaft 15 are turned by a motor 16 operating through a drive coupling preferably in the form of a belt drive 17.

A timing disc 18 is mounted on the drum 13 and is used to indicate to the external circuitry the position, at any instant of time, of the drum 13 as it rotates in front of the recording head 14. The timing indications on the timing disc 18 are sensed by a pick-up 19 which generates two outputs. One output is amplified by an amplifier 20 and provides an output signal each time the drum 13 begins another revolution with the top edge of the paper 11 in front of the recording head 14. Amplifier 21 is used to amplify a companion signal from the timing disc 18 which is produced each time the drum positions a new dot recording location on the paper 11 in front of the recording head 14. Therefore, the output of the amplifier 20 comprises a line or scan signal at the beginning of a scan, and the output of the amplifier 21 is produced at each dot location on a scan line as the drum 13 rotates.

The output of the amplifiers 20 and 21 are delivered to a logic circuit 23, a more specific example of which is shown in FIG. 4 of the accompanying drawings. The logic circuit 23 receives four darkness or density input signal in binary form, thereby providing up to 16 different shade indications. The four darkness or density inputs to the logic circuit 23 may be derived from the digitized output from a video tape recorder or from a facsimile scanner.

It has been found experimentally that 16 different gray shades are adequate for the production of acceptable-quality images of graphic data. These gray shades are not necessarily even numbers of dots or droplets. For example, in the case of a 4 × 4 matrix printing up to eight drops of ink at each dot location, as many as 128 drops can be used to completely fill the area of a matrix cell. It has not been found necessary to produce all 128 shades possible with 128 different numbers of drops, because 16 different quantities of drops can produce a sufficiently satisfactory gray shade range, provided that these 16 shades are judiciously chosen from among the 128 shades possible.

The output of the logic circuit 23 is delivered to a recording amplifier 27. The output of the recording amplifier 27 is connected to a charging electrode 28.

In a typical ink jet recorder, a solid stream of ink is emitted under pressure from a nozzle 30 in a straight line 31 toward a mask or catcher 32. In the absence of any charging signals applied to the charging electrode 28, all the ink emitted by the nozzle 30 strikes the catcher 32 and passes through a drain line 34 to a drain sump 36. From thence it is discarded or recycled.

However, in order to redirect selected drops of ink onto the paper 11, a voltage is selectively applied by the recording amplifier 27 to the charging electrode 28 when the drum 13 is in an appropriate position. A voltage on the charging electrode 28 charges drops of ink as they separate from the solid stream of electrically conductive ink issuing from the nozzle 30. The charge on each drop is a function of the voltage difference between the conductive ink in contact with the nozzle 30 and the charging electrode 28 at the instant at which the drop separates from the solid stream of conductive ink.

A charged drop of ink as it progresses along the straight, dotted line 31 towards the catcher 32 comes under the influence of a pair of deflecting electrodes 37 and 39 which are maintained at a high voltage difference by a battery or other voltage source 41. The electrostatic field between the electrodes 37 and 39 combined with the electrostatic charge on the moving drop of ink causes each charged drop to deviate from its original straight path towards the catcher 32, into a curved trajectory which impinges at a predetermined location upon the paper 11. Assuming that drops separate at fixed, regular intervals, the duration of the charging voltage signal issued by the amplifier 27 corresponds to a discrete number of drops formed at the end of the stream of ink issuing from the nozzle 30. That discrete number of drops is then deposited at the appropriate location on the paper 11.

Ink is supplied to the nozzle 30 from a pressure ink source 42 through a flexible hose 43 which accommodates movement of the recording head 14 as it slowly traverses across the paper 11.

As the ink issues from the nozzle 30, it is a solid stream of fluid breaking into individual drops only within the charging electrode 28. In order to assure that the ink breaks into drops of uniform size and at fixed, regular intervals, a jet synchronizing clock 51 is used to provide vibratory signals through an amplifier 53 to a transducer 55 connected to the structure of the nozzle 30. This forms undulations in the ink stream issuing from the nozzle 30 which undulations are controlled by the frequency of the clock 51.

PATTERN GENERATION

Referring now to FIG. 2, the simplest matrix pattern is shown in which a matrix area or cell is composed of four dot locations. Naturally, the surface of the paper 11 is comprised of many, many such matrix areas or cells with each matrix cell having four dot locations.

As an example of the operation of the present invention in conjunction with the specific embodiment illustrated in FIG. 2, assume that each dot is composed of zero to eight drops of ink. Consequently, if a matrix cell on the paper is to be left white, no drops of ink are recorded at any of the four drop locations of the matrix cell. Conversely, if the matrix cell is to be full black, eight drops of ink are deposited at each dot location in the matrix cell. As many as 31 shades of gray plus black and white are thus possible since there are four dots in a matrix and eight drops of ink per dot. Therefore, each matrix cell can be printed with zero to 32 drops of ink.

However, it has been found that the eye is more sensitive to variations in the lighter shades of gray than in the darker shades of gray. For example, the difference between no drops of ink in an entire matrix cell and one drop of ink present at one of the four dot locations of a matrix cell is more noticeable than the difference between a total of 31 drops of ink at the four dot locations of a matrix cell and a total of 32 drops of ink at the four dot locations of a matrix area or cell. Therefore, density or tonal gradations of the lighter shades tend to have a smaller difference in the number of drops between each shade of gray than at the darker end of the tone or shading scale.

In FIG. 2, the cross-hatched dot locations are printed with one drop more than the other locations. Therefore, if the shade desired calls for depositing three drops of ink at each dot location in the matrix cell, for example, then pattern 4 will be used (FIG. 2) in which all dots in the matrix receive the same number (three) of drops, for a total of 12 drops over the entire matrix cell. However, if, for example, 15 drops are to be deposited in the entire matrix cell, pattern 3 is used in which four drops are deposited at each dot location except in location 3 where only three drops are deposited. Similarly, if 18 drops are required over the entire matrix for the proper shade of gray, pattern number 2 is used in which each dot location receives five drops, except for locations 2 and 3 which receive four drops of ink each. A similar situation holds true for pattern 1.

In reproducing pictures using half-tone shading, it has been found desirable to have the matrix cell patterns arranged to form diagonal lines at least in the lighter shades. This subject matter is disclosed in a copending application of J. M. Berry, Ser. No. 583,503, filed of even date herewith. The matrix patterns illustrated in FIG. 2 noticeably form diagonal lines only with patterns 2 and 3.

Also, if it is found desirable to produce finer gradations of gray shades than is possible with zero to 32 drops of ink in each matrix cell, the shading system of the matrix cell patterns of FIG. 3 might be more desirable. In this 4 × 4 matrix cell 16 dot locations are used. In FIG. 3 as in FIG. 2, the cross-hatched dot locations are printed with one drop of ink more than the other locations. Pattern 16, similar to pattern 4 of FIG. 2, is used when each dot location of the matrix cell receives exactly the same number of drops of ink. For example, if each dot location receives three drops of ink then there are 48 drops of ink deposited over the total 16-dot matrix pattern.

However, if 65 drops of ink are necessary over the entire 16-dot matrix, a pattern similar to pattern 1 of FIG. 3 is used in which each of the 16 dot locations receives four drops except that dot location number 4 receives five drops of ink.

The same situation holds true for each of the remaining patterns illustrated in FIG. 3. The patterns of FIG. 3 are only exemplary of the possible ways in which a 4 × 4 matrix pattern might be organized. It will be evident to one skilled in the art that a 5 × 5 or larger matrix pattern is also possible with further benefit.

The minimum matrix cell required is determined by the maximum gray tone increment allowable between white and the first gray shade, which shade will consist of one single-drop dot per matrix cell or area. This is so because, as described above, a given increment of ink produces the greatest visual effect at the light end of the tone scale. The other dot patterns for the matrix cell are chosen so as to minimize the coarseness of the image area printed with each pattern.

It is well known in graphic arts that half-tone patterns are preferably printed at 45° with respect to horizontal and vertical. For this reason a preferred matrix cell may be chosen so as to have two single-drop dots for the first gray shade positioned as nearly as possible to the preferred 45° pattern. Other dot patterns are also chosen with this consideration in mind. An examination of the patterns of FIG. 3 reveals that these patterns promote diagonal lines in half-tone images. This is particularly evident when one draws nine closely-spaced sets of the same pattern in order to see the 45° lines continued over several matrix cells.

LOGIC CIRCUITS

Referring now to FIG. 4 of the accompanying drawings, a logic circuit is shown which is substantially the logic circuit 23 of FIG. 1. The four binary density of darkness inputs A, B, C and D are delivered to a conventional four-to-16 binary decoding circuit 70. The decoder 70 may be 16 four-input AND-gates but is preferably an integrated circuit similar to SN 74154N manufactured by Texas Instruments, Inc., with inverted outputs.

The decoder 70 performs the conventional binary decoding function of receiving the four binary or darkness inputs A, B, C, and D and producing in response thereto a voltage signal on only a selected one of its 16 darkness tone output wires 72.

Each of the 16 outputs 72 of the decoding circuit 70 is connected to one of up to eight resistive timing network gates 74. In addition, most of the output wires 72 of the decoding circuit 70 are also selectively connected to the inputs of a trio of pattern selecting OR-gates 78.

Referring momentarily to the function of the timing gates 74, each timing gate is comprised of an isolation diode 80 and a timing resistor 82. Each gate also has an isolation amplifier or OR-gate 84. The voltage signal from the decoding circuit 70 on the appropriate, selected one of the 16 output wires 72 of the decoding circuit 70 causes the associated OR-gate 84 to forward bias its associated isolation diode 80 in order to connect its associated timing resistor 82 to the timing capacitor 86 of a monostable multivibrator 88. The duration of the quasistable state of the monostable multivibrator 88 is thus controlled by the combination of the timing capacitor 86 and the selected one of the timing resistors 82.

This time period of the quasistable state of the monostable multivibrator 88 corresponds to an integral number of drops to be deposited at the dot location then present before the recording head 14. Therefore, the monostable multivibrator, when triggered by the dot amplifier 21 issues a charging pulse through the amplifier 27 (also FIG. 1) to the charging electrode 28. Therefore, the charging pulse has a duration controlled by the selection of the timing resistor 82. The duration of the charging pulse determines the number of drops of ink deposited at the associated dot location. Since, as previously noted, an arbitrary maximum of eight drops of ink per dot has been chosen, a maximum of up to eight different timing resistors 82 is required. It will be noted that the monostable multivibrator 88 is triggered to its quasistable state by the timing pulse issued by the timing disc 18 through the pick-up 19 and the dot amplifier 21.

To energize the charging electrode 28, the output of the monostable multivibrator 88 passes through a differential amplifier 90 prior to being applied to the amplifier 27. The differential amplifier 90 performs a function similar to an exclusive OR-gate and is used to implement the operation of the pattern selector gates 78. The pattern selector gates 78 determine which of the dots of FIG. 2 will be of reduced density by directing the deletion of one drop at specific dot locations. When pattern 4 (FIG. 2) is selected, none of the three pattern gates 78 is energized. This results in equal numbers of drops being deposited at the four dot locations of the matrix.

As an example of pattern 4 selection, when either of the tone wires 72-1 or 72-5 is energized, the signal energizes an OR-gate 84-1. The one-drop timing gate made up of the OR-gate 84-1, the timing resistor 82-1, and the isolation diode 80-1 is thus energized. The timing resistor 82-1 is thus connected through the diode 80-1 to the capacitor 86 to control the monostable multivibrator 88 when triggered by the dot amplifier 21 to time out and interval sufficient to charge only one drop of ink. Each time that one of the four dot locations of a given matrix area is to be printed, the same binary darkness signal (A, B, C, & D) is delivered to the decoder 70.

If the tone wire 72-5 is energized, each dot location receives one drop of ink. However, if the tone wire 72-1 is energized, that energizing signal passes through an OR-gate 92 and triggers a drop-delete monostable multivibrator 93 which then also times out an interval sufficient to charge one drop of ink. The timing components of the monostable multivibrator 93 are all internal. When both of the monostable multivibrators 88 and 93 are in the quasistable state, the differential amplifier 90 receives identical signals at both of its inputs and thus cannot issue a charging signal to the amplifier 27. Therefore, each time the tone wire 72-1 is energized, no drops are charge and no ink is printed at any dot location of the matrix.

The function of the differential amplifier 90 is to issue an output when the monostable multivibrator 88 is in its quasistable state and when the monostable multivibrator 93 is in its stable state but to issue no output when both monostable multivibrators 88 and 93 are in their quasistable state and when both are in their stable state. Naturally, an exclusive OR-gate can be used in place of the differential amplifier 90. Alternatively, a simple AND-gate can be used in place of the differential amplifier 90 if the connection from the monostable multivibrator 93 is taken from an inverted output as is quite common with binary circuits.

The desired darkness or tonal density of each dot is determined independently of every other dot in a matrix cell. In this way, contrast can be maintained even if a white-black transition occurs in the middle of a cell. Therefore, some of the dots can comprise eight drops of ink for full black, and some of the dots of the same matrix cell can be all white with no ink.

If a dot is to be printed at a shade or density somewhere between full black or white, it will comprise a number of drops of ink determined by the binary darkness signals A, B, C, and D. However, most of the shades or tones require, in a four-dot matrix cell, a total number of drops that is not divisible by four. Therefore, certain of the dots must contain one less (or more) drop of ink than others. This is the pattern set shown in FIG. 2 (and also FIG. 3). The location of a dot within the matrix cell determines whether or not it contains one less than the maximum number of drops associated with the shade or tone for that dot location.

Therefore, if some shade is requested for a dot location, which shade represents in a mactrix cell a total number of drops that is not divisible by four, the associated darkness tone output wire 72 from the decoding circuit 70 energizes one of the pattern gates 78 in addition to its associated timing resistor gate 74. As an example of this operation, suppose that shade or darkness tone number 4 is selected. Tone output wire 72-4 is then energized. The one-drop resistive timing gate is thus energized to connect the associated timing resistor 82-1 through the associated diode 80-1 to the timing capacitor 86. The monostable multivibrator 88 then signals the differential 90 for a one-drop interval. The tone wire 72-4 also delivers a signal through a pattern number 3 OR-gate 78-3 to provide one input of a dot number 3 AND-gate 94. The other two inputs of the AND-gate 94 are provided by a pair of flip-flops or bistable multivibrators 96 and 98. The bistable multivibrator 96 functions as a modulo-two binary counter and receives dot clock inputs from the amplifier 21. The flip-flop 96 simply changes binary state each time that a dot is to be printed. It delivers two outputs, a normal and an inverted output. A normal output means that dot numbeer 3 or dot number 4 is to be printed (see FIG. 2). An inverted output means that dot number 1 or dot number 2 is to be printed.

The bistable multivibrator 98 similarly functions as a modulo-two binary counter and receives an input from the amplifier 20 each time that a new scan line is started at each revolution of the platen 13. It, too, has a normal output and an inverted output. A normal output means that dot number 1 or dot number 3 is to be printed. An inverted output means that dot number 2 or dot number 4 is to be printed. Therefore, the bistable multivibrator 96 is a dot flip-flop and the bistable 98 is a line or scan flip-flop. The flip-flops 96 and 98 thus determine the dot location within a matrix cell area that is being printed. One of the inputs to the AND-gate 94 is provided by the normal output of the flip-flop 96, the other input to the AND-gate 94 is provided by the normal output of the flip-flop 98. Therefore, when dot number 3 of the matrix is to be printed, then and only then will the right-most two inputs of the AND-gate 94 receive their energization voltages. If at the same time the OR-gate 78-3 is energized, the number 3 dot AND-gate 94 issues a voltage signal through the OR-gate 92 to an AND-gate 99 at the trigger input of the monostable multivibrator 93. Since the duration of the quasistable state of the monostable multivibrator 93 is equal to one drop generation interval, and the output of the monostable multivibrator 93 is connected to the differential amplifier 90, the differential amplifier 90 issues no output charging voltage. Therefore, the number 3 dot location receives no ink.

Consequently, when any one of the tone wires 72-1 to 72-5 is energized, the monostable multivibrator 88 issues a one-drop charge timing pulse. If the tone wire 72-1 is selected, the monostable multivibrator 93 cancels the charge timing pulse in the differential amplifier 90. If the wire 72-5 is selected, the monostable multivibrator 93 does not operate and one drop of ink is charged and deposited on the paper 11 irrespective of dot location being printed within the matrix cell. If the one wire 72-4 is selected, one drop of ink is charged and deposited at each dot location except number 3. When the number 3 dot location is to be printed, the AND-gate 94 is energized and triggers the monostable multivibrator 93 which cancels the drop-charge timing pulse.

In order to assure the timing integrity of the circuit of FIG. 4, a delay circuit 100 is introduced into the dot trigger signal issuing from the dot amplifier 21 and going to the trigger inputs of the monostable multivibrators 88 and 93. The duration of the delay 100 need only be long enough to accommodate the signal transients of the flip-flops 96 and 98, and AND-gate 94, the OR-gate 92 and the AND-gate 99, etc.

As a further example, if the output tone wire 72-3 of the decoding circuit 70 is now chosen, it energizes the pattern selector OR-gate 78-3 and another pattern selector OR-gate 78-2 which is connected to a number 2 dot AND-gate 102.

When the number 2 dot is to be printed, the flip-flops 96 and 98 cause the AND-gate 102 to respond to the output of the OR-gate 78-2 and to trigger the monostable multivibrator 93 through the OR-gate 92 and the AND-gate 99 in order to prevent a drop from being charged and deposited at the number 2 dot location. When the flip-flops 96 and 98 select the number 3 dot AND-gate 94, it triggers the monostable multivibrator 93 to prevent the charge and deposition of a drop of ink at the number 3 dot location. Since the number 1 and 4 dots are the only dots printed, pattern 2 (FIG. 2) results.

Taking as a further example the energization of the tone output wire 72-15 of the decoding circuit 70, the pattern selector OR-gate 78-4 is energized in additional to the pattern selector OR-gates 77-2 and 78-3. Also, the tone wire 72-15 is connected to a timing resistor gate comprising the NOR-gate 84-8, the resistor 82-8, and the isolation diode 80-8. This connects the resistor 82-8 to the capacitor 86 to cause the monostable multivibrator 88 to time a multidrop interval—for example, eight drops—each time the dot amplifier 21 issues a dot pulse.

It has been presumed that the darkness tone number 15 requires 29 drops of ink total over the four dots of the matrix area. This is made up by triggering the monostable multivibrator 88 for eight drop intervals at each dot location and triggering the monostable multivibrator 93 to subtract one drop interval at each of the number 2, 3, and 4, dot locations to conform to pattern number 1 of FIG. 2.

The subtraction is accomplished when the pattern selection OR-gate 78-4 is energized in addition to the OR-gates 78-2 and 78-3 by the tone wire 72-15. The output of the pattern selector OR-gate 78-4 energizes one input of a number 4 dot AND-gate 104.

The outputs of these AND-gates 94, 102, and 104, at appropriate times, energize or trigger the monostable multivibrator 93 through the OR-gate 92 and the AND-gate 99 to subtract a dot interval using the differential amplifier 90.

It will be evident to one skilled in the art that the selection of the pattern to be printed, the number of dots, the number of drops for each dot, and which dots are to experience deletion of a drop are arbitrarily determined by the wiring between the decoding circuit 70, the timing resistance gates 74, and the pattern selection gates 78.

Since the the input to the circuit of FIG. 4 is derived directly from the darkness inputs A, B, C, and D each time that a dot is to be printed, the darkness inputs can change each time that a dot is printed without upsetting the operation of the printer. Therefore, if a high-contrast transition crosses a matrix area, the printer can print darker dots on the dark side than on the light side. That is, each dot is printed with a darkness totally unrelated to the darkness of any other dot location. This facilitates the printing of good half-tone patterns with no degradation of contrast, even with sharp black-white transitions as in alphanumeric printing or line drawings.

It will be evident to one skilled in the art that the circuit of FIG. 4 can readily be modified to add one drop of ink to selected dot locations rather than delete one drop as shown. All that is required is to use the monostable multivibrator to extend the charging interval of selected dot locations rather than subtracting and thus foreshortening the charging intervals. To accomplish this, the differential amplifier 90 is changed to an OR-gate, the inverse output of the monostable multivibrator 88 rather than the delay 100 provides the trigger input to the AND-gate 99. For single, drop intervals, the delay 100 must still be used to energize the monostable multivibrator 93. However, this can easily be controlled from the outputs of the decoder 70. The arbitrary interconnections between the wires 72, the timing gates 74 and the pattern gates 78 must be rearranged to produce the desired pattern set, for example as shown in FIG. 2.

Although only one specific embodiment of the invention is shown in the drawings, and described in the foregoing specification, it will be understood that invention is not limited to the specific embodiment described, but is capable of modification and rearrangement and substitution of parts and elements without departing from the spirit of the invention.

What is claimed is:

1. A method of refining a gray shade image produced with a liquid ink-jet recorder that projects discrete drops of ink onto a record divided into matrix cells, each matrix cell including a plurality of dot locations;
   depositing enough drops of liquid ink at each dot location of a matrix cell to produce approximately the requisite shade for that dot location within the matrix cell; and
   selectively adjusting the number of drops deposited at a dot location of the matrix cell area to refine the approximation to a more accurate half-tone representation of the image.

2. In an ink jet device for recording dots on a record, apparatus for forming images having shades of gray, comprising:
   means for causing the recording device to deposit at a predetermined dot location in a matrix cell on the record a number of drops of ink substantially representative of the shade to be recorded at the matrix cell location; and
   means responsive to the location of the predetermined dot within the matrix cell for selectively adjusting, by one, the number of drops of ink deposited at the predetermined dot location so as to refine the density of the image recorded on the record.

3. An apparatus according to claim 2 wherein the causing means causes the recording device to deposit the minimum number of drops to produce the shade of gray.

4. An apparatus according to claim 3 wherein the adjusting means adjusts by selectively increasing by one the number of drops of ink deposited at a given dot location.

5. An apparatus according to claim 4 wherein the selective increase is dependent upon the shade of gray to be reproduced at the dot location of the matrix and the position of the dot location within the matrix.

6. An apparatus according to claim 2 wherein the number of drops of ink caused to be deposited at a dot location within a matrix cell is sufficient, except for the operation of the adjusting means, to produce a shade no darker than the shade of the dot location.

7. An ink jet device for recording dots on a record, including apparatus for matrix-forming images having shades of gray, comprising:
   means for depositing at each dot location of a matrix of dot locations a number of drops of ink to produce a shading no lighter than the shading of that dot location within its associated matrix cell; and
   means for selectively depositing an additional drop of ink at selected matrix cell dot locations to darken the cell no more than the darkness produced by an additional drop of ink at all dot locations of the cell.

8. An apparatus according to claim 2 wherein the causing means causes the recording device to deposit the maximum number of drops to produce the shade of gray.

9. An apparatus according to claim 8 wherein the adjusting means adjusts by selectively decreasing by one the number of drops of ink deposited at a given dot location.

10. An apparatus according to claim 9 wherein the selective decrease is dependent upon the shade of gray to be reproduced at the dot location of the matrix and the position of the dot location within the matrix.

11. An apparatus according to claim 2 wherein the number of drops of ink caused to be deposited at a dot location within a matrix cell is sufficient, except for the operation of the adjusting means, to produce a shade no lighter than the shade of the dot location.

* * * * *